United States Patent
Benhase et al.

(10) Patent No.: US 9,779,030 B2
(45) Date of Patent: *Oct. 3, 2017

(54) GROUPING TRACKS FOR DESTAGING

(71) Applicant: INTERNATIONAL BUSINESS MACHINES CORPORATION, Armonk, NY (US)

(72) Inventors: Michael T. Benhase, Tucson, AZ (US); Lokesh M. Gupta, Tucson, AZ (US); Matthew J. Kalos, Tucson, AZ (US); Brian A. Rinaldi, Tucson, AZ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/160,609

(22) Filed: May 20, 2016

(65) Prior Publication Data

US 2016/0267019 A1 Sep. 15, 2016

Related U.S. Application Data

(63) Continuation of application No. 13/856,191, filed on Apr. 3, 2013, now Pat. No. 9,361,241.

(51) Int. Cl.
G06F 12/00 (2006.01)
G06F 12/122 (2016.01)
G06F 12/128 (2016.01)
G06F 13/00 (2006.01)
G06F 13/28 (2006.01)
G06F 12/123 (2016.01)

(52) U.S. Cl.
CPC .......... *G06F 12/122* (2013.01); *G06F 12/128* (2013.01); *G06F 12/123* (2013.01); *G06F 2212/69* (2013.01)

(58) Field of Classification Search
CPC ................................................... G06F 12/123
See application file for complete search history.

(56) References Cited

U.S. PATENT DOCUMENTS

| 8,127,084 B2 | 2/2012 | Gill et al. |
| 2003/0105928 A1 | 6/2003 | Ash et al. |
| 2008/0040553 A1 | 2/2008 | Ash et al. |
| 2008/0195807 A1 | 8/2008 | Kubo et al. |
| 2008/0250200 A1 | 10/2008 | Jarvis et al. |

*Primary Examiner* — Mark Giardino, Jr.
(74) *Attorney, Agent, or Firm* — Griffiths & Seaton PLLC

(57) ABSTRACT

Various embodiments for grouping tracks for destaging by a processor device in a computing environment are provided. Tracks are selected for destaging from a least recently used (LRU) list and the selected tracks are moved to a destaging wait list. One of the selected tracks is selected from the destaging wait list and the selected tracks are grouped for destaging. A first track and a last track are located from the group of selected tracks of the destaging wait list. The destaging is commenced from the first track in the group of selected tracks. A track is added to the group of selected tracks if the track is one of modified and located in a cache, otherwise, a next one of the selected tracks in the group of selected tracks is moved to.

17 Claims, 5 Drawing Sheets

GROUPING TRACKS FOR DESTAGING

CROSS-REFERENCE TO RELATED APPLICATIONS

This application is a Continuation of U.S. patent application Ser. No. 13/856,191, filed Apr. 3, 2013, the contents of which are hereby incorporated by reference.

BACKGROUND OF THE INVENTION

Field of the Invention

The present invention relates in general computing systems, and more particularly to, systems and methods for grouping tracks for destaging.

Description of the Related Art

In today's society, computer systems are commonplace. Computer systems may be found in the workplace, at home, or at school. Computer systems may include data storage systems, or disk storage systems, to process and store data. Contemporary computer storage systems are known to destage storage tracks from cache to long-term storage devices so that there is sufficient room in the cache for data to be written. When destaging the storage tracks, contemporary storage systems destage the storage tracks from each rank in the cache when the cache is becoming full or the global pressure factor is high. That is, storage tracks are destaged from each rank when the global pressure factor is high, even though some ranks in the cache may only be storing a small number of storage tracks with respect to the amount of storage space allocated to these ranks. Moreover, destaging tasks assist with starting the destaging of storage tracks to the storage systems.

SUMMARY OF THE INVENTION

Various embodiments for grouping tracks for destaging by a processor device in a computing environment are provided. Tracks are selected for destaging from a least recently used (LRU) list and the selected tracks are moved to a destaging wait list. One of the selected tracks is selected from the destaging wait list and the selected tracks are grouped for destaging. A first track and a last track are located from the group of selected tracks of the destaging wait list. The destaging is commenced from the first track in the group of selected tracks. A track is added to the group of selected tracks if the track is one of modified and located in a cache, otherwise, a next one of the selected tracks in the group of selected tracks is moved to.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
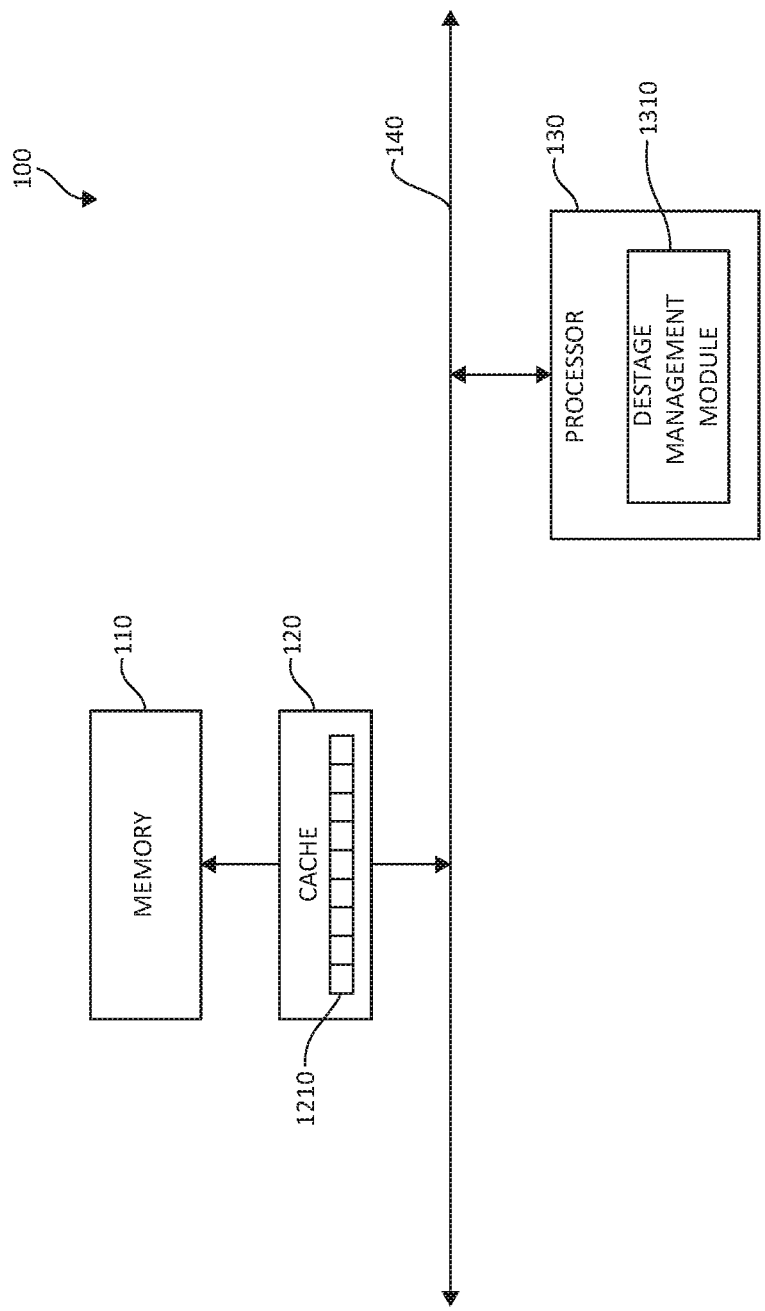
FIG. 1 illustrates is a block diagram showing an exemplary hardware structure for smoothing destaging tasks in which aspects of the present invention may be realized.

As mentioned previously, contemporary computer storage systems are known to destage storage tracks from cache to long-term storage devices so that there is sufficient room in the cache for data to be written. In one embodiment, Wise Ordering for Writes (WOW), which are lists that are used for exploiting both temporal and spatial locality by ordering the list according to the storage location to which an associated task or request is directed, add a destaging task control blocks ("TCBs"), or simply "destaging tasks" one at a time. In one embodiment, destaging tasks are used to manage the movement of data within a data storage and retrieval system and between a host computer and the data storage and retrieval system. In other words, the destage TCBs are tasks that destage tracks from a cache to storage (e.g., disk drives). The destaging TCBs may be a command to start the destaging of the storage track.

However, for efficient destaging, destage grouping is important to prevent a RAID penalty (RAID-5 and RAID-6). For example, a destage of a single track for RAID-5 rank may cause 4 drive operations (e.g., read parity, read old data, destage new data, and destage new parity). If a full stripe is destaged, then a RAID controller does not need to fetch the old parity and old data, and only one drive operation is needed for the destage. Even in cases where full stripe cannot be grouped, it is beneficial to have as many tracks in stripe as possible since a RAID penalty is paid just once for N tracks instead of paying penalty for each track destage. For example, a stripe is a set of tracks on which parity is computed. For example, in a 6+p RAID-5 array, there are 6 disks of data and one disk of parity. Some fixed number of tracks from each disk are taken and parity is computed by XORing the data among those tracks. When all of the tracks of stripe are in cache then parity can be computed by simply XORing data between tracks of that stripe. But if only few tracks of the stripe are in cache then parity cannot be computed from just those tracks in cache. To compute the new parity, old data (for tracks that have been modified) and old parity is staged. New parity can now be computed by seeing the difference in old data and new data and looking at the old parity. Since the old data is staged and old parity to destage modified data, there are several more drive operations. This is known as RAID penalty. If, for example, there are N tracks of a stride in cache, and if a decision is made to destage each track separately, then each destage will have to pay the RAID penalty. Instead if destaged all the tracks in one destage then the RAID penalty is paid just once.

When data is arranged in a LRU (Least Recently Used) fashion and there are several tasks trying to destage at once, grouping may become complex as these tasks may compete with one another for the same set of tracks making the destage grouping sub-optimal. Thus, a need exist for optimally grouping tracks from an LRU list for destaging. In one embodiment, a destage task may have just one track to destage, but the destage scan task may have more than one track to destage. In one embodiment, grouping is having a group of tracks for a destage task.

To address these inefficiencies, the present invention provides a solution for grouping tracks for destaging using a processor device in a computing environment. In one embodiment, by way of example only, tracks are selected for destaging from a least recently used (LRU) list and the selected tracks are moved to a destaging wait list. In one embodiment, a LRU list is a list of tracks ordered in a Least Recently used fashion. The selected tracks are grouped and destaged from the destaging wait list. In other words, the present invention picks only certain tracks (e.g., a first track of the stride) for destaging from the LRU list whenever possible (e.g., there are cases where first track is not in cache or not modified or not fully in cache thus the present invention cannot move the first track to the separate list.). In other words, at least one track of the stride is picked and moved onto another list where destage TCBs are doing the grouping. Thus, two destage TCBs will not be able to do grouping on the same stride at the same time. For example, the certain tracks may be the last track, or second track, or third track and the like, and present invention just wants one track of the stride on this separate list.

The present invention moves these selected tracks to a new list (e.g., a destage waiting list) and then groups the tasks for destaging from this new destage waiting list. In one embodiment, the destage wait list (or destage waiting list) is a list of tracks waiting to be destaged. Also, as used herein, in one embodiment, by way of example only, a destage scan task is a task that may go through an LRU list and locates tracks that may be destaged and moves them to the destage wait list (DWL) list.

Turning to FIG. 1, a block diagram of one embodiment of a system 100 for smoothing destaging tasks. At least in the illustrated embodiment, system 100 comprises a memory 110 coupled to a cache 120 and a processor 130 via a bus 140 (e.g., a wired and/or wireless bus).

Memory 110 may be any type of memory device known in the art or developed in the future. Examples of memory 110 include, but are not limited to, an electrical connection having one or more wires, a portable computer diskette, a hard disk, a random access memory (RAM), an erasable programmable read-only memory (EPROM or Flash memory), an optical fiber, a portable compact disc read-only memory (CD-ROM), an optical storage device, a magnetic storage device, or any suitable combination of the foregoing. In the various embodiments of memory 110, storage tracks are capable of being stored in memory 110. Furthermore, each of the storage tracks can be destaged to memory 110 from cache 120 when data is written to the storage tracks.

Cache 120, in one embodiment, comprises a write cache partitioned into one or more ranks 1210, where each rank 1210 includes one or more storage tracks. Cache 120 may be any cache known in the art or developed in the future.

During operation, the storage tracks in each rank 1210 are destaged to memory 110 in a foreground destaging process after the storage tracks have been written to. That is, the foreground destage process destages storage tracks from the rank(s) 1210 to memory 110 while a host (not shown) is actively writing to various storage tracks in the ranks 1210 of cache 120. Ideally, a particular storage track is not being destaged when one or more hosts desire to write to the particular storage track, which is known as a destage conflict.

In various embodiments, processor 130 comprises or has access to a destage management module 1310, which comprises computer-readable code that, when executed by processor 130, causes processor 130 to perform the present invention. In the various embodiments, processor 130 is configured to calculate the number of destaging tasks according to either a standard time interval and a variable recomputed destaging task interval.

In various other embodiments, processor 130 is configured to either ramp up and/or ramp down the destaging tasks and the current number of destaging task.

In various other embodiments, processor 130 is configured to either decrement the current number of destaging tasks by a value of one, if greater than the desired number of destaging tasks and/or increment the current number of destaging tasks by a value of one, if less than the desired number of destaging tasks. Subsequent to either decrementing or incrementing, the processor 130 is configured to recalculate the current number of destaging tasks after reaching either the standard time interval and the variable recomputed destaging task interval that is selected for the calculating.

In one embodiment, each rank 1210 is allocated the same predetermined amount of storage space in cache 120. In another embodiment, at least two ranks 1210 are allocated different predetermined amounts of storage space in cache 120. In still another embodiment, each rank 1210 is allocated a different predetermined amount of storage space in cache 120. In each of these embodiments, each predetermined amount of storage space in cache 120 is not to exceed a predetermined maximum amount of storage space.

In various embodiments, processor 130 is configured to allocate the predetermined maximum amount of storage space on a percentage basis. In one embodiment, the predetermined maximum amount of storage space allocated to a respective rank 1210 is in the range of about one percent to about twenty-five percent (1%-50%) of the total storage capacity of cache 120. In another embodiment, the predetermined maximum amount of storage space allocated to a respective rank 1210 is twenty-five percent (25%) of the total storage capacity of cache 120.

In various other embodiments, processor 130 is configured to allocate the predetermined maximum amount of storage space on a storage track basis. That is, each rank 1210 is limited to a predetermined maximum number of storage tracks, which can vary from rank to rank.

Processor 130, in various embodiments, is configured to monitor each rank 1210 in cache 120 and determine the amount of storage tracks each respective rank 1210 is storing with respect to its allocated amount of storage space in cache 120. In one embodiment, processor 130 is configured to determine the amount of storage tracks in each respective rank 1210 on a percentage basis. That is, processor 130 is configured to monitor each rank 1210 and determine the percentage each respective rank 1210 is using to store storage tracks with respect to the individual allocations of the total storage space in cache 120.

In another embodiment, processor 130 is configured to determine the number of storage tracks in each respective rank 1210. Specifically, processor 130 is configured to monitor each rank 1210 and determine the number of storage tracks each respective rank 1210 is using to store storage tracks with respect to the individual allocations of the total storage space in cache 120.

Processor 130, in various embodiments, is configured to destage storage tracks from each respective rank 1210 until a predetermined minimum amount of storage space remains in each respective rank 1210 with respect to its predetermined allocated amount of storage space in cache 120, and then cease to or no longer destage storage tracks from ranks 1210 that are using less than or equal to the predetermined minimum amount of storage space. In one embodiment, processor 130 is configured to destage storage tracks from each rank 1210 until a predetermined percentage (e.g., thirty percent (30%)) of the predetermined amount of storage space in cache 120 is reached. In another embodiment, processor 130 is configured to destage storage tracks from each rank 1210 until a predetermined minimum number of storage tracks are reached.

For example, in an embodiment that includes ten (10) ranks 1210 in which each rank 1210 is allocated 10 percent (10%) of the total storage space of cache 120 and the predetermined minimum amount of storage tracks is thirty percent (30%), processor 130 will continue to destage storage tracks from each rank 1210 that includes more than three percent (3%) of the total storage capacity of cache 120 (i.e., 10%×30%=3%). Once a particular rank 1210 has reached the three percent threshold, processor 130 will cease to or no longer destage storage tracks from the particular storage track until the particular rank 1210 is using more than the predetermined amount of storage tracks is (i.e., three percent of the total storage capacity of cache 120 in this example).

Processor 130, in various embodiments, is configured to utilize a formula to determine the number of destage tasks to utilize when destaging storage tracks from each respective rank 1210. In the various embodiments, the formula is based on the global pressure factor of cache 120 as it relates to each respective rank 1210. That is, the number of destage tasks utilized to destage storage tracks from each respective rank 1210 is proportional to the amount of its allocated storage space each respective rank 1210 is multiplied by the global pressure factor, which is a factor determined by a collective percentage of the total amount of storage space in cache 120 being utilized by ranks 1210.

In one embodiment, the formula includes a predetermined maximum number destage tasks (e.g., forty (40) destage tasks) that is utilized when a particular rank 1210 is utilizing a large amount of its allocated storage space and the global pressure factor is high. In other embodiments, the formula includes a default of zero (0) destage tasks that is utilized when a particular rank 1210 is utilizing an amount of storage space less than or equal to the predetermined minimum amount with respect to its allocated amount of storage space in cache 120.

Processor 130, in various embodiments, is configured to select tracks for destaging from a least recently used (LRU) list and move the selected tracks to a destaging wait list. The selected tracks, via the processor 130, are grouped and destaged from the destaging wait list.

Figure 2:
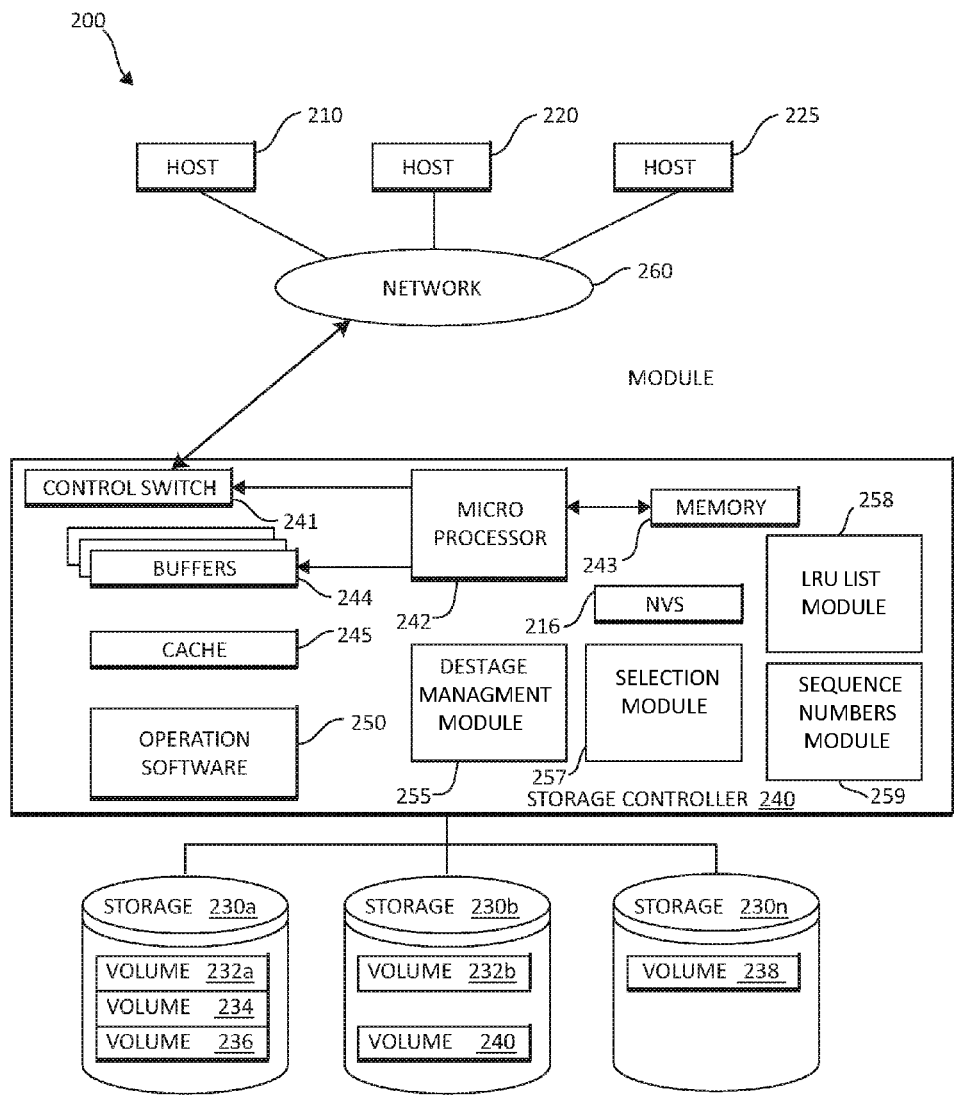
FIG. 2 is a block diagram showing an exemplary hardware structure of a data storage system in a computer system according to the present invention in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controller 240 and storage 230. In one embodiment, the embodiments described herein may be applicable to a variety of types of computing architectures, such as in a virtual cluster management environment using the various embodiments as described herein.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores the operation software 250, program instructions and data, which the processor 242 may access for executing functions and method steps associated with managing storage 230, and executing the steps and methods of the present invention. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a destage management module 255, a selection module 257 (e.g., a track selection module), a least recently used (LRU) list module 258, and a destage waiting list (DWL) module 259. The destage management module 255, the selection module 257, the LRU list module 258, and the destage waiting list module 259 may be one complete module functioning simultaneously or separate modules. The destage management module 255, the selection module 257, the LRU list module 258, and the destage waiting list module 259 may have some internal memory (not shown) and may store unprocessed, processed, or "semi-processed" data. The destage management module 255, the selection module 257, the LRU list module 258, and the destage waiting list module 259 may work in conjunction with each and every component of the storage controller 240, the hosts 210, 220, 225, and other storage controllers 240 and hosts 210, 220, and 225 that may be remotely connected via the storage fabric 260. Both the destage management module 255, the selection module 257, the LRU list module 258, and the destage waiting list module 259 may be structurally one complete module or may be associated and/or included with other individual modules. The destage management module 255, the selection module 257, the LRU list module 258, and the destage waiting list module 259 may also be located in the cache 245 or other components of the storage controller 240.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, cache 245 for temporarily storing (buffering) data, and buffers 244 for assisting the cache 245 to read and write data, a control switch 241 for controlling a protocol to control data transfer to or from the destage management module 255, the selection module 257, the LRU list module 258, and the destage waiting list module 259 in which information may be set. Multiple buffers 244 may be implemented to assist with the methods and steps as described herein.

In one embodiment, the host computers or one or more physical or virtual devices, 210, 220, 225 and the storage controller 240 are connected through a network adaptor (this could be a fibre channel) 260 as an interface i.e., via a switch called "fabric." The microprocessor 242 may control the memory 243 to store command information from the cluster host/node device (physical or virtual) 210 and information for identifying the cluster host/node device (physical or virtual) 210. The control switch 241, the buffers 244, the cache 245, the operating software 250, the microprocessor 242, memory 243, NVS 216, the destage management module 255, the selection module 257, the LRU list module 258, and the destage waiting list module 259 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

Figure 3:
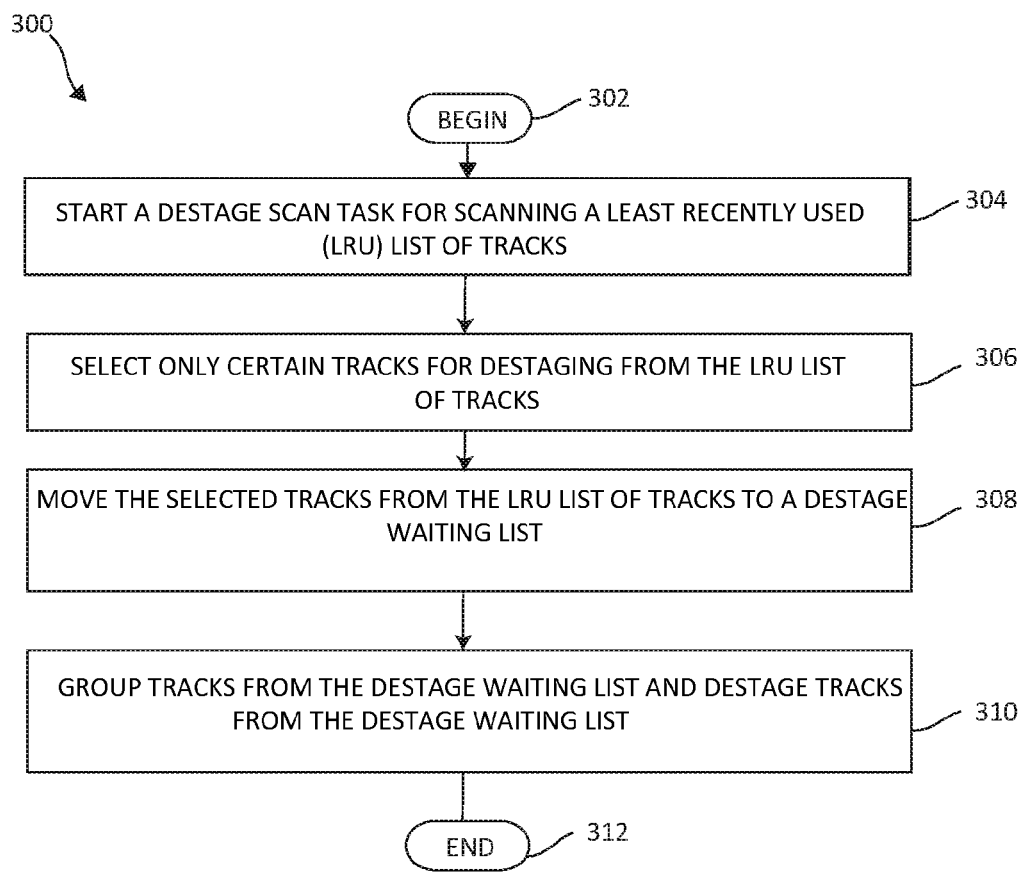
FIG. 3 is a flowchart illustrating an exemplary method grouping tracks for destaging in which aspects of the present invention may be realized.

Turning to FIG. 3, a flowchart illustrates an exemplary method 300 for grouping tracks for destaging is depicted. The method 300 begins (step 302). The method 300 starts performing a destage scan task for scanning a least recently used (LRU) list of tracks (step 304). The method 300 selects only certain tracks for destaging from the LRU list of tracks (step 306). The method 300 moves the selected tracks from the LRU list to a new destage waiting list (step 308). The method 300 groups tracks from the destage waiting list (DWL) and destages tracks from the destage waiting list (step 310). The method 300 ends (step 312).

Destage Scans and Query Grouping Conflict

In one embodiment, a destage scan will start scanning the LRU list of tracks (e.g., metadata tracks) and move tracks to the destage waiting list (DWL list). For a track that the destage scan encounters, the present invention locates and/or finds the group of tracks that are adjacent to each other on the disk (e.g., a stride) and then finds the first track of the group. Before moving the track (i.e., the track that the destage scan is looking at) to the DWL list, the destage scan will check and see if the first track of the group is located in a cache. If the first track of the group is in a cache then the present invention will move the first track of the group to the DWL instead of moving the track (i.e., the track that the destage scan is looking at) to the DWL list.

In one embodiment, a destage scan of a least recently used (LRU) list of tracks (is performed. For each track that the disk scan of the LRU list encounters, a destage scan track (e.g., a track that is encountered that the destage scan is looking at) a group of tracks that are adjacent to each other on the disk/stride (e.g., adjacent to the destage scan track) are located. The first track of the group of tracks is located. If the first track of the group is being destaged the destage scan track is not moved to a destage waiting list and the destage scan track advances to the next track. The destage scan is going through the LRU end of a modified metadata list, one at a time. It should be noted that the modified metadata list may be considered the LRU list. If the first track of the group is not being destaged, the destage scan track is moved to the DWL and the destage scan track advances to the next track.

In one embodiment, if the first track of the group is not in cache, the destage scan track is moved to the destage waiting list (DLW). The LRU list (or a modified metadata track list) does not have all the tracks in cache, rather, it only has modified tracks. The case above means that if a starting track in the group (i.e., the first track of the group) is not in cache (either modified or un-modified) then the destage scan track is moved from the modified metadata track list to the DWL. If the first track of the group is in cache, is modified, and/or the first track of the group is fully (e.g., completely) in the cache than the destage scan track is not moved to the destage waiting list (DLW) (step 420). However, if the first track in the group in the cache is not modified and/or if the first track of the group is not fully (e.g., completely) in the cache then the destage scan track is moved to a destage waiting list (DLW). In other words, if the starting track in the group of tracks (i.e. the first track of the group of tracks) is in cache but un-modified then the destage scan track is moved from the modified metadata track list to the DWL. In other words, if the first track in cache is modified, the destage scan track is not moved to a destage waiting list (DLW). If the starting track in the group (i.e. the first track of the group of tracks is in cache but parts of the track are not in cache (i.e. the first track is not fully in cache) then the destage scan track is moved from the modified metadata track list to the DWL. Also, for any other scenario not listed above, the destage scan track is not moved the DWL list. In one embodiment, the various processes may also be described below in FIG. 4.

Figure 4:
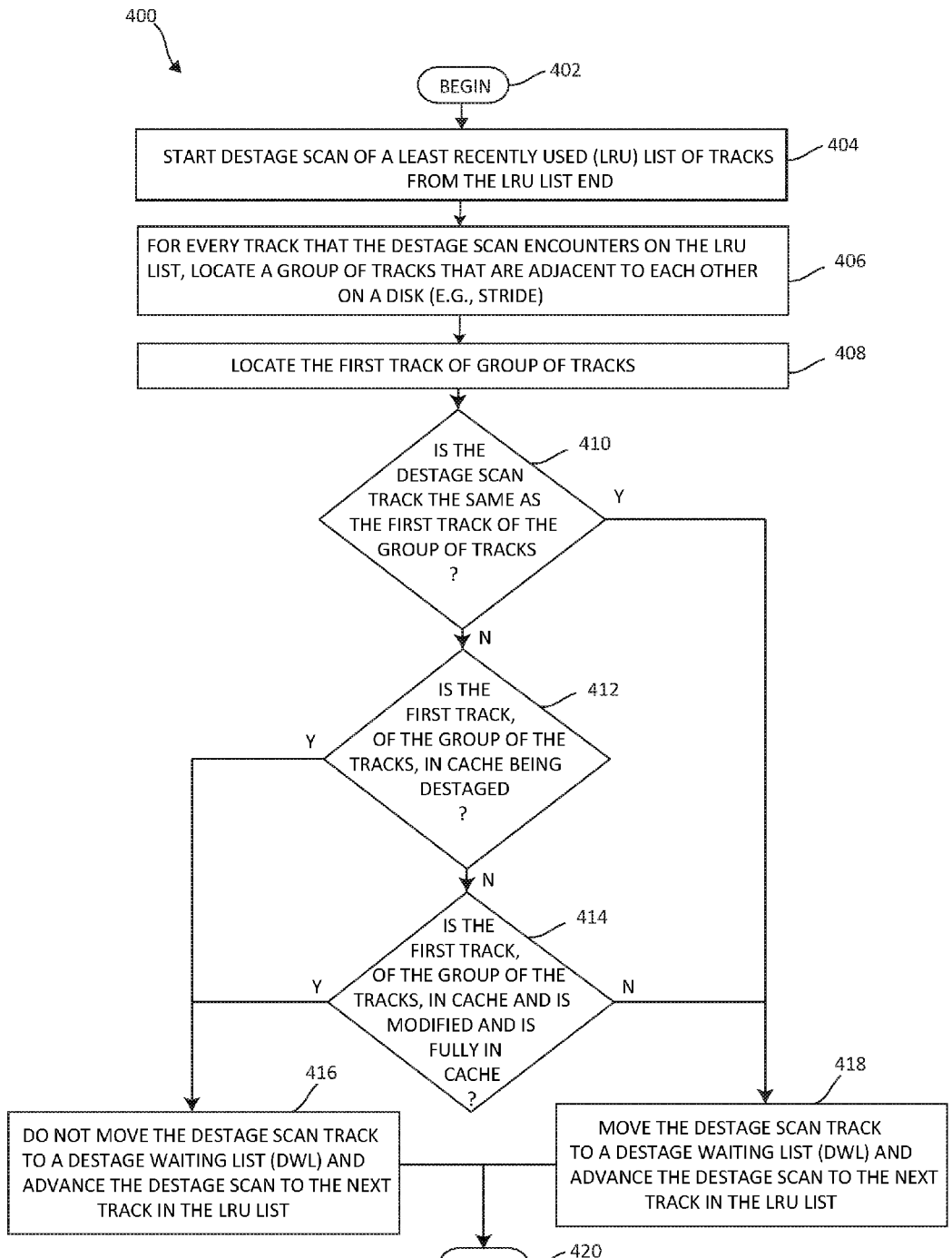
FIG. 4 is a flow chart illustrating an exemplary method for destage scanning and moving tracks from a least recently used track list to a destage waiting list in which aspects of the present invention may be realized.

Turning to FIG. 4, a flowchart illustrating an exemplary method 400 for destage scanning and moving tracks from a least recently used track list to a destage waiting list is depicted. The method 400 begins (step 402). The method 400 starts a destage scan of a least recently used (LRU) list of tracks from the LRU list end (step 404). For every track that the destage scan encounters on the LRU list, the method 400 locates a group of tracks that are adjacent to each other on a disk (e.g., stride) (step 406). The method 400 locates the first track of group of tracks (step 408). The method 400 determines if the destage scan track (e.g., a track that is encountered that the destage scan is looking at) is the same as the first track of the group of tracks (step 410). If yes, the method 400 moves the destage scan track to a destage waiting list (DWL) and advances the destage scan to the next track in the LRU list (step 418). If no, the method 400 determines if the first track, of the group of tracks, in cache being destaged (step 412). If yes, the method 400 does not move the destage scan track to the destage waiting list (DWL) and advances the destage scan to the next track in the LRU list (step 416). If no, the method 400 determines if the first track, of the group of tracks, that is in the cache I modified and is fully (completely) in the cache (step 414). If yes, the method 400 does not move the destage scan track to the destage waiting list (DWL) and advances the destage scan to the next track in the LRU list (step 416). If no, the method 400 moves the destage scan track to a destage waiting list (DWL) and advances the destage scan to the next track in the LRU list (step 418). The method 400 ends (step 420).

Destage Grouping

In one embodiment, by way of example only, the destage TCBs will pick a track from the DWL list and start destage grouping. In one embodiment, for performing the destage grouping for tracks (e.g., metadata tracks) the following steps are performed. First, the first track and last track in a group of selected tracks from a destage waiting list, are located. Next, starting from the first track in the group, the selected tracks are destaged. However, if a track is in cache and modified, the track is added to the destage group. If the track is not in the cache and not modified, the present invention moves to the next track in the destage group. Last, if this is the last track of the group then the process ends the destaging of the group. In other words, the present invention keeps processing until tracks are added to the destage task. Once the destage task has processed all the tracks and built a group, the present invention destages the entire group.

Figure 5:
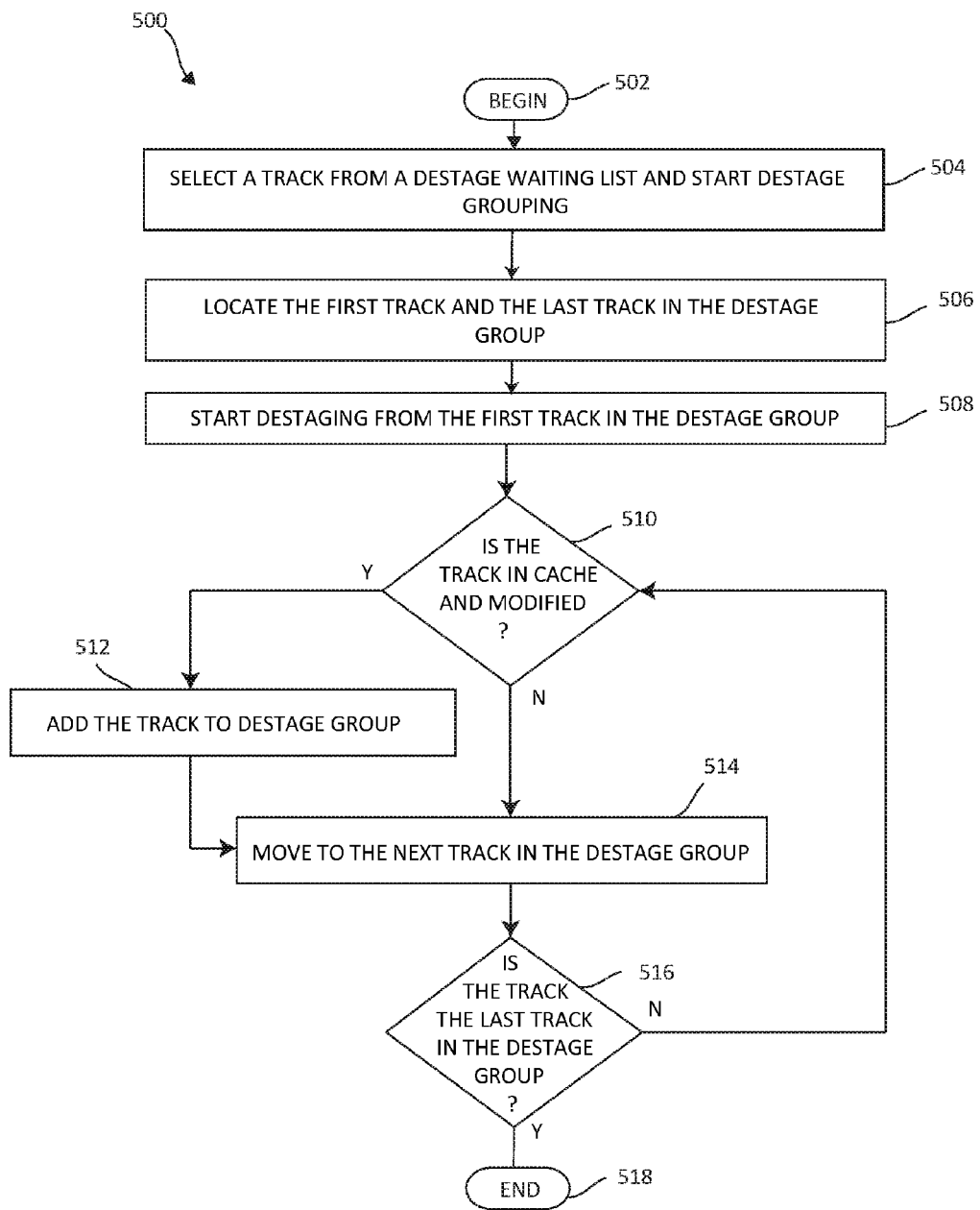
FIG. 5 is a flow chart illustrating an exemplary method for grouping and destaging tracks from a destage waiting list in which aspects of the present invention may be realized.

Turning to FIG. 5, a flowchart illustrates an exemplary method 500 for grouping and destaging tracks from a destage waiting list is depicted. The method 300 begins (step 502). The method 500 starts, begins by selecting a track from a destage waiting list and starts destage grouping (step 504). The method 500 locates the first track and the last track in the destage group (step 506). The method 500 starts destaging from the first track in the destage group (step 508). The method 500 then determines if the track is located in cache and modified (step 510). If yes, the method 500 adds the track to the destage group (step 512). If no, the method 500 moves to the next track in the destage group (step 514). The method 500 then determines if a track is the last track in the destage group (step 516). If yes, the method 500 ends (step 518). If no, the method returns to 510 after destaging the track.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for grouping tracks for destaging by a processor device in a computing environment, the method comprising:
   selecting tracks for destaging from a least recently used (LRU) list and moving the selected tracks to a destaging wait list;
   selecting one of the selected tracks from the destaging wait list and grouping the selected tracks for destaging;
   locating a first track and a last track from the group of selected tracks of the destaging wait list;
   commencing the destaging from the first track in the group of selected tracks; and
   adding a track to the group of selected tracks if the track is one of modified and located in a cache, otherwise:
      moving to a next one of the selected tracks in the group of selected tracks.

2. The method of claim 1, further including grouping and destaging the selected tracks from the destaging wait list; and
   performing a destaging scan task by traversing the LRU list and locating those tracks eligible for destaging.

3. The method of claim 2, further including locating a group of tracks adjacent to each other on a stride.

4. The method of claim 3, further including finding the first track of the group of tracks.

5. The method of claim 4, further including:
   determining via the destaging scan task if the first track is located in a cache, wherein:
      if the first track is located in the cache, moving the first track located in the cache to the destaging wait list.

6. The method of claim 5, further including, performing one of:
   prohibiting the removal of the first track of the group of tracks to the destaging wait list if the first track of the group of tracks is being destaged, and
   moving the first track to the destaging wait list if one of the first track is not in the cache, if the first track is not modified, and if the first track is not a full track.

7. A system for grouping tracks for destaging in a computing environment, the system comprising:
   at least one processor device operable in the computing storage environment, wherein processor device:
      selects tracks for destaging from a least recently used (LRU) list and moving the selected tracks to a destaging wait list,
      selects one of the selected tracks from the destaging wait list and grouping the selected tracks for destaging,
      locates a first track and a last track from the group of selected tracks of the destaging wait list, commences the destaging from the first track in the group of selected tracks, and
adds a track to the group of selected tracks if the track is one of modified and located in a cache, otherwise: moves to a next one of the selected tracks in the group of selected tracks.

8. The system of claim 7, wherein the at least one processor device groups and destages the selected tracks from the destaging wait list, and
performs a destaging scan task by traversing the LRU list and locating those tracks eligible for destaging.

9. The system of claim 8, wherein the at least one processor device locates a group of tracks adjacent to each other on a stride.

10. The system of claim 9, wherein the at least one processor device finds the first track of the group of tracks.

11. The system of claim 10, wherein the at least one processor device: determines via the destaging scan task if the first track is located in a cache, wherein:
if the first track is located in the cache, moves the first track located in the cache to the destaging wait list.

12. The system of claim 11, wherein the at least one processor device performs one of:
prohibiting the removal of the first track of the group of tracks to the destaging wait list if the first track of the group of tracks is being destaged, and
moving the first track to the destaging wait list if one of the first track is not in the cache, if the first track is not modified, and if the first track is not a full track.

13. A computer program product for increased destaging efficiency by smoothing destaging tasks to reduce long input/output (I/O) read operations in a computing environment by a processor device, the computer program product comprising a non-transitory computer-readable storage medium having computer-readable program code portions stored therein, the computer-readable program code portions comprising:

an executable portion that selects tracks for destaging from a least recently used (LRU) list and moving the selected tracks to a destaging wait list;
an executable portion that selects one of the selected tracks from the destaging wait list and grouping the selected tracks for destaging; and
an executable portion that:
locates a first track and a last track from the group of selected tracks of the destaging wait list,
commences the destaging from the first track in the group of selected tracks, and
adds a track to the group of selected tracks if the track is one of modified and located in a cache, otherwise: moves to a next one of the selected tracks in the group of selected tracks.

14. The computer program product of claim 13, further including an executable portion that groups and destages the selected tracks from the destaging wait list; and
an executable portion that locates a group of tracks adjacent to each other on a stride.

15. The computer program product of claim 14, further including an executable portion that finds the first track of the group of tracks.

16. The computer program product of claim 15, further including an executable portion that:
determines via the destaging scan task if the first track is located in a cache, wherein:
if the first track is located in the cache, moves the first track located in the cache to the destaging wait list.

17. The computer program product of claim 16, further including an executable portion that performs one of:
prohibiting the removal of the first track of the group of tracks to the destaging wait list if the first track of the group of tracks is being destaged, and
moving the first track to the destaging wait list if one of the first track is not in the cache, if the first track is not modified, and if the first track is not a full track.

* * * * *